United States Patent
Sekiguchi et al.

(10) Patent No.: US 9,309,470 B2
(45) Date of Patent: Apr. 12, 2016

(54) PROCESS AND APPARATUS FOR PRODUCING OLEFIN

(75) Inventors: Mitsuhiro Sekiguchi, Tokyo (JP); Takashi Tsunoda, Tokyo (JP)

(73) Assignee: ASAHI KASEI CHEMICALS CORPORATION, Tokyo (JP)

( * ) Notice: Subject to any disclaimer, the term of this patent is extended or adjusted under 35 U.S.C. 154(b) by 187 days.

(21) Appl. No.: 13/119,150

(22) PCT Filed: Sep. 1, 2009

(86) PCT No.: PCT/JP2009/065270
§ 371 (c)(1),
(2), (4) Date: Mar. 15, 2011

(87) PCT Pub. No.: WO2010/032609
PCT Pub. Date: Mar. 25, 2010

(65) Prior Publication Data
US 2011/0172477 A1    Jul. 14, 2011

(30) Foreign Application Priority Data

Sep. 17, 2008    (JP) .................................. 2008-237886

(51) Int. Cl.
*C07C 4/02* (2006.01)
*C07C 4/06* (2006.01)
(Continued)

(52) U.S. Cl.
CPC ................. *C10G 11/20* (2013.01); *B01J 29/40* (2013.01); *B01J 37/0018* (2013.01); *B01J 37/0045* (2013.01); *B01J 37/30* (2013.01); *C10G 9/36* (2013.01); *C10G 11/05* (2013.01);
(Continued)

(58) Field of Classification Search
USPC ......... 585/314, 315, 324, 329, 502, 518, 520, 585/643, 648, 649, 650, 651, 322, 330; 208/67, 69, 70
See application file for complete search history.

(56) References Cited

U.S. PATENT DOCUMENTS 3,360,587 A    12/1967   Adams
4,100,218 A    7/1978    Chen et al.
(Continued)

FOREIGN PATENT DOCUMENTS

JP    H 8-113606      5/1996
JP    H09-504817 A    5/1997
(Continued)

OTHER PUBLICATIONS

International Preliminary Report on Patentability dated Apr. 28, 2011 issued in corresponding International Application No. PCT/JP2009/065270.
(Continued)

*Primary Examiner* — In Suk Bullock
*Assistant Examiner* — Youngsul Jeong
(74) *Attorney, Agent, or Firm* — Finnagan, Henderson, Farabow, Garrett & Dunner, L.L.P.

(57) ABSTRACT

The present invention provides a process for producing olefin having 3 or more carbon atoms from ethane stably in a simpler process. The present invention provides a method for producing olefin having a step of obtaining a cold fraction by cooling an ethane-cracked gas, which is obtained by thermal cracking of ethane in the presence of steam, to 600° C. or less; and a step of obtaining a catalytic cracking gas containing olefin having 3 or more carbon atoms by bringing the cold fraction into contact with a catalyst containing a medium pore diameter zeolite.

17 Claims, 3 Drawing Sheets

(51) Int. Cl.

| | | |
|---|---|---|
| *C10G 11/20* | (2006.01) | |
| *B01J 29/40* | (2006.01) | |
| *B01J 37/00* | (2006.01) | |
| *B01J 37/30* | (2006.01) | |
| *C10G 9/36* | (2006.01) | |
| *C10G 11/05* | (2006.01) | |
| *C10G 11/18* | (2006.01) | |
| *C10G 31/06* | (2006.01) | |
| *C10G 70/00* | (2006.01) | |
| *B01J 29/44* | (2006.01) | |
| *B01J 29/46* | (2006.01) | |
| *B01J 35/10* | (2006.01) | |
| *B01J 37/04* | (2006.01) | |

(52) U.S. Cl.
CPC .............. *C10G 11/18* (2013.01); *C10G 11/187* (2013.01); *C10G 31/06* (2013.01); *C10G 70/00* (2013.01); *B01J 29/44* (2013.01); *B01J 29/46* (2013.01); *B01J 35/1052* (2013.01); *B01J 37/04* (2013.01); *B01J 2229/42* (2013.01); *C10G 2300/1081* (2013.01); *C10G 2300/807* (2013.01); *C10G 2400/02* (2013.01); *C10G 2400/20* (2013.01); *C10G 2400/22* (2013.01)

(56) References Cited

U.S. PATENT DOCUMENTS

| | | | |
|---|---|---|---|
| 4,547,615 A | 10/1985 | Yamamoto et al. | |
| 4,560,536 A | 12/1985 | Tabak | |
| 4,717,782 A * | 1/1988 | Garwood et al. | 585/531 |
| 4,851,602 A | 7/1989 | Harandi et al. | |
| 5,043,517 A * | 8/1991 | Haddad et al. | 585/533 |
| 5,138,112 A * | 8/1992 | Gosling et al. | 585/317 |
| 5,777,188 A * | 7/1998 | Reed et al. | 585/648 |
| 5,942,652 A | 8/1999 | Duijsens et al. | |
| 6,187,987 B1 * | 2/2001 | Chin et al. | 585/819 |
| 6,242,661 B1 * | 6/2001 | Podrebarac et al. | 585/664 |
| 7,223,895 B2 | 5/2007 | Sumner | |
| 2003/0149322 A1 | 8/2003 | Koss et al. | |
| 2005/0107650 A1 | 5/2005 | Sumner | |
| 2005/0194289 A1 * | 9/2005 | Overbeek et al. | 208/120.01 |
| 2006/0016725 A1 | 1/2006 | Das et al. | |
| 2007/0135668 A1 * | 6/2007 | Sumner | 585/324 |
| 2008/0200740 A1 | 8/2008 | Waycuilis | |

FOREIGN PATENT DOCUMENTS

| | | |
|---|---|---|
| JP | 3214984 B | 7/2001 |
| JP | 2005-120281 | 5/2005 |
| JP | 2005-225781 | 8/2005 |
| JP | 4076227 | 2/2008 |
| WO | WO 98/56740 | 12/1998 |
| WO | WO 01/51590 | 7/2001 |
| WO | WO 2007/046986 A2 | 4/2007 |

OTHER PUBLICATIONS

Toshihide Baba, "Methane no Zotan Hanno ni yoru Ekitai Nenryo no Gosei," Iwatani Naoharu Kinen Zaidan Kenkyu, Hokokusho, 2006, vol. 29, pp. 67-69.

Linsheng Wang et al., "Upgrading of Ethane over HZSM-5 Supported Mo and Re Catalysts with Membrane Reactors," Dai 88 Kai Shokubai Toronkai Toronkai A Yokoshu, 2001, p. 9.

International Search Report dated Oct. 6, 2009 issued in International Application No. PCT/JP2009/065270.

David R. Lide et al., CRC Handbook of Chemistry and Physics, 75$^{th}$ Edition, published by CRC Press Inc. (1994-1995), p. 1-15.

Office Action for JP Application No. 2010-529708 issued Jan. 17, 2014.

Supplementary European Search Report dated Jun. 18, 2012.

* cited by examiner

PROCESS AND APPARATUS FOR PRODUCING OLEFIN

TECHNICAL FIELD

The present invention relates to a process and an apparatus for producing olefin having 3 or more carbon atoms by thermal cracking of ethane and catalytic conversion with a zeolite catalyst.

BACKGROUND ART

A process for efficiently obtaining ethylene by thermal cracking of ethane has been widely known. However, in conventionally known processes, ethylene can be produced in high yield; however, olefin having 3 or more carbon atoms is produced only in an extremely small amount.

For example, U.S. Pat. No. 7,223,895 (Patent Document 1) discloses a process for producing propylene from ethylene, which is obtained by thermal cracking of ethane in the presence of steam, by use of a metathesis reaction.

SUMMARY OF THE INVENTION

Problems to be Solved by the Invention

However, the procedure described in Patent Document 1 requires a compression step. This process further requires a complicated purification step consisting of a plurality of stages to remove low-boiling point fractions and high-boiling point fractions, acetylene and water which are contained together with ethylene in the gas generated by the aforementioned thermal cracking. In the circumstances, a simpler process for producing olefin having 3 or more carbon atoms has been desired.

An object of the present invention is to provide a process for producing olefin having 3 or more carbon atoms form ethane, and more specifically, a process and an apparatus for producing olefin more easily and stably.

Means for Solving the Problems

The present inventors have conducted studies with a view to attaining the aforementioned objects. As a result, it is found that olefin having 3 or more carbon atoms can be stably manufactured by bringing ethane into contact with a catalyst containing a medium pore diameter zeolite without purifying the gas obtained from thermal cracking of ethane in the presence of steam. Based on the finding, the present invention was accomplished.

More specifically, the present invention provides the following processes for producing olefin having 3 or more carbon atoms.

[1] A process for producing olefin comprising the steps of: obtaining a cold fraction by cooling an ethane-cracked gas, which is obtained by thermal cracking of ethane in the presence of steam, to 600° C. or less; and obtaining a catalytic cracking gas containing olefin having 3 or more carbon atoms by bringing said cold fraction into contact with a catalyst containing a medium pore diameter zeolite.

[2] A process for producing olefin comprising the steps of: obtaining a cold fraction by cooling an ethane-cracked gas, which is obtained by thermal cracking of ethane in the presence of steam, to 600° C. or less; separating said cold fraction into a liquid heavy fraction and a cold gas; and obtaining a catalytic cracking gas containing olefin having 3 or more carbon atoms by bringing said cold gas into contact with a catalyst containing a medium pore diameter zeolite.

[3] The process according to the above item [2], further comprising the step of separating and recovering a whole or part of aromatic hydrocarbons from said heavy fraction.

[4] The process according to any one of the above items [1] to [3], wherein, said cold fraction or said cold gas is brought into contact with said catalyst in a fluidized bed reactor in said step of obtaining the catalytic cracking gas; and further comprising the steps of: removing continuously or intermittently a part of said catalyst passed through said step of obtaining the catalytic cracking gas from said fluidized bed reactor, and bringing said catalyst into contact with an oxygen-containing gas to burn at least a part of the carbonaceous compounds adhered to said catalyst; and supplying said catalyst passed through said burning step again to said fluidized bed reactor.

[5] The process according to any one of the above items [1] to [4], wherein said ethane-cracked gas is cooled to 300 to 600° C. in said step of obtaining the cold fraction.

[6] The process according to any one of the above items [1] to [5], further comprising the steps of: separating ethane from said catalytic cracking gas; and recycling at least a part of said ethane as a raw material for the thermal cracking of ethane.

[7] The process according to any one of the above items [1] to [6], wherein at least one selected from the group consisting of propylene, a C4 fraction and a gasoline fraction is generated from the ethylene contained in said ethane-cracked gas in said step of obtaining the catalytic cracking gas.

[8] The process according to the above item [7], wherein a part of said at least one and/or at least a part of unreacted ethylene passed through said step of obtaining a catalytic cracking gas is recycled as a raw material to be subjected to the step of obtaining the catalytic cracking gas.

[9] The process according to the above item [7] or [8], further comprising the step of separating and recovering i-butene and/or n-butene from said C4 fraction.

[10] The process according to any one of the above items [7] to [9], further comprising the step of separating and recovering a whole or part of aromatic hydrocarbons from said gasoline fraction.

The present invention further provides an apparatus for producing olefin having 3 or more carbon atoms, below.

[11] An apparatus for producing olefin having 3 or more carbon atoms from ethane, comprising
a cooler connected to a first reactor for obtaining ethane-cracked gas by thermally cracking ethane in the presence of steam, for obtaining a cold fraction by receiving and cooling said ethane-cracked gas discharged from said first reactor; and
a second reactor connected to said cooler and filled with a catalyst containing a medium pore diameter zeolite, for receiving said cold fraction discharged from said cooler and bringing said cold fraction into contact with said catalyst.

[12] An apparatus for producing olefin having 3 or more carbon atoms form ethane, comprising
a cooler connected to a first reactor for obtaining ethane-cracked gas by thermally cracking ethane in the presence of steam, for obtaining a cold fraction by receiving and cooling said ethane-cracked gas discharged from said first reactor;
a gas/liquid separator connected to said cooler, for separating said cold fraction discharged from said cooler into a liquid-state heavy fraction and a cold gas; and
a second reactor connected to said gas/liquid separator and filled with a catalyst containing a medium pore diameter zeolite, for receiving said cold gas discharged from said gas/liquid separator and bringing said cold gas into contact with said catalyst.

Effect of the Invention

According to the production process and the apparatus of the present invention, it is possible to provide a process and apparatus for producing olefin having 3 or more carbon atoms from ethane, simply and stably.

MODE FOR CARRYING OUT THE INVENTION

Now, embodiments for carrying out the invention (hereinafter simply referred to as "embodiments") will be more specifically described, if necessary, with reference to the drawings. The following embodiments are only examples for illustrating the present invention and are not intended to limit the invention only to the embodiments. The present invention can be carried out in various modes as long as they do not depart from the gist of the invention. Note that, like reference numerals designate like structural elements in the drawings and any further explanation is omitted. Furthermore, positional indications like up/down and right/left are referred to based on the positions shown in the drawings unless otherwise specified. Moreover, the dimensional ratios of the drawings are not limited to those indicated in the drawings.

Figure 1:
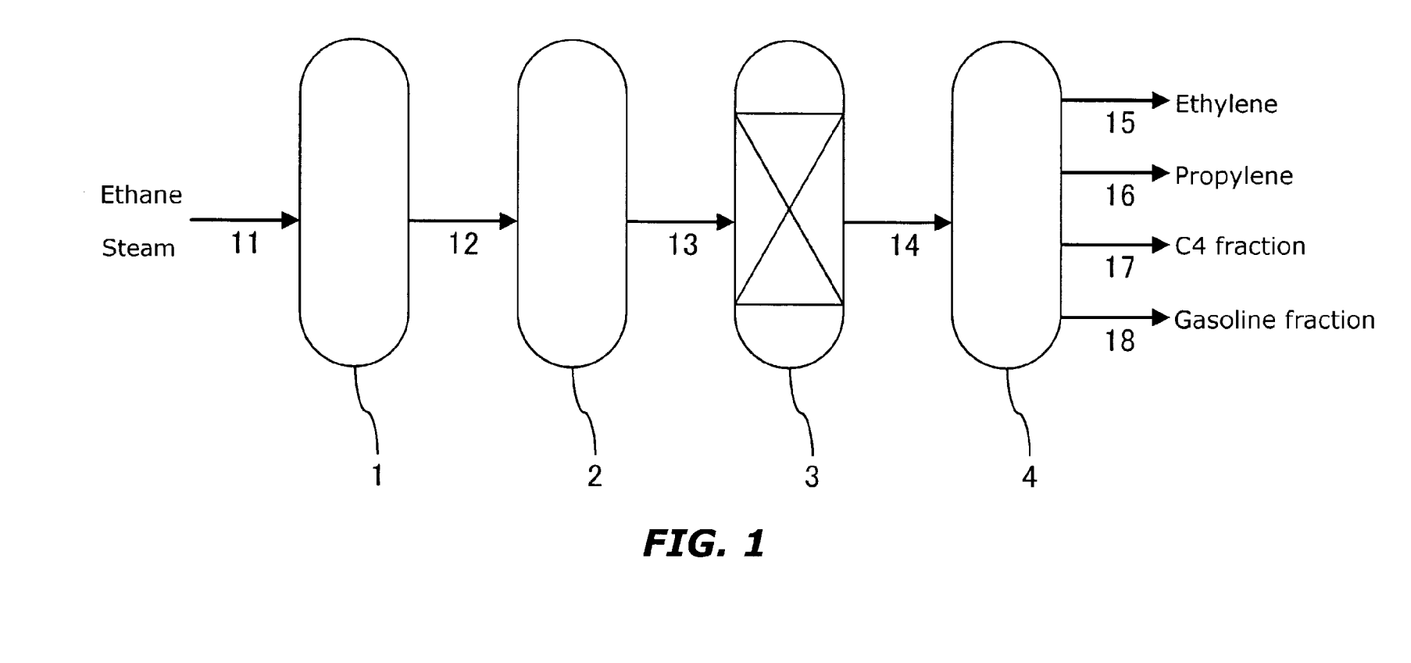
FIG. 1 is a schematic view showing an apparatus for use in a process for producing olefin according to an embodiment of the invention.

FIG. 1 is a schematic view showing an apparatus for use in a process for producing olefin of an embodiment of the invention. The apparatus for producing olefin shown in FIG. 1 has a first reactor (thermal cracking reactor 1), a cooler 2, a second reactor (catalytic-reaction unit 3) and a separator 4.

To the thermal cracking reactor 1, ethane and steam are supplied through a pipe 11. The thermal cracking reactor 1 containing ethane and steam has a convection unit (not shown), in which ethane and steam are preheated to about 600° C. Note that if necessary, a preheater may be provided outside the thermal cracking reactor 1 in place of or in addition to the convection unit. Steam and the ethane pre-heated are further heated in the thermal cracking reactor 1 and thermally cracked to produce ethane-cracked gas containing ethylene (ethane thermal cracking step).

The ethane material to be supplied to the thermal cracking reactor 1 may contain small amounts of methane and propane etc. other than ethane. Furthermore, the ethane material may be separated from natural gas, fractionated from petroleum gas or obtained as a by-product through thermal cracking of naphtha or heavy oil. Alternatively, the ethane material may be ethane produced from a process for producing another product.

The reaction temperature (thermal cracking temperature) in the ethane thermal cracking step preferably is within the range of 780 to 880° C. The reaction pressure preferably is within the range of 0.05 to 1 MPa, and more preferably within the range 0.1 to 0.5 MPa. The mass ratio of steam to ethane preferably is within the range of 0.1 to 2.0, and more preferably within the range of 0.2 to 1.0. The retention time of steam and ethane in the thermal cracking reactor 1 is preferably within 5 seconds, and more preferably within 2 seconds. In view of suppressing coking, steam and ethane are preferably supplied simultaneously to the thermal cracking reactor 1. As the reaction pressure, for example, the outlet pressure may be measured. However, there is no substantial difference in pressure between the inlet and the outlet. The reaction pressure may be measured either one of the inlet and the outlet.

The ethane conversion rate derived from the following expression (1) preferably is within the range of 40 to 80% by mass, and more preferably within the range of 60 to 80% by mass. When the ethane conversion rate is not less than 40% by mass, more sufficient yield of ethylene can be ensured. In view of the heat resistance of the material for the thermal cracking reactor 1, the ethane conversion rate is preferred to be not more than 80% by mass.

Ethane conversion rate=((ethane concentration of supply flow through the inlet of thermal cracking reactor)−(ethane concentration of discharge flow through the outlet of thermal cracking reactor))/(ethane concentration of supply flow through the inlet of thermal cracking reactor)×100   (1)

The ethane-cracked gas may contain, other than ethylene, for example, unreacted ethane, water, hydrogen, carbon monoxide, carbon dioxide, alkanes other than ethane, olefins other than ethylene and aromatic hydrocarbons. Examples of the alkanes include methane, propane, butane, pentane and hexane. Examples of the olefins include propylene, butene, pentane and hexene. Examples of the aromatic hydrocarbons include benzene, toluene, xylene, ethyl benzene and styrene. The ethane-cracked gas may contain, other than the aforementioned substances, cycloalkanes such as cyclopentane, methylcyclopentane and cyclohexane, cycloolefins such as cyclopentene, methylcyclopentene and cyclohexene.

Furthermore, the ethane-cracked gas may generally contain acetylene compounds such as acetylene and methylacetylene and diolefin (dienes) compounds such as propadiene, butadiene, pentadiene and cyclopentadiene.

The thermal cracking reactor 1 is connected to the cooler 2 by way of a pipe 12. As the cooler 2, a general heat exchanger is preferably used. In this case, steam is employed as a coolant, and the heat quantity of the thermally cracked gas of ethane is used for changing to high-pressure steam and collecting, which can be used also as a power source for driving the separation step described later. Note that, FIG. 1 shows a single cooler 2; however, if necessary, a plurality of coolers may be provided.

The ethane-cracked gas containing ethylene discharged from the thermal cracking reactor 1 is supplied to the cooler 2 by way of the pipe 12. In the cooler 2, ethane-cracked gas is cooled to 600° C. or less to obtain a cold fraction (cooling step). The reaction of olefin in the ethane-cracked gas can be prevented by cooling the ethane-cracked gas to 600° C. or less.

The cooling temperature preferably is within the range of 300 to 600° C. If the cooling temperature is controlled within the range, the reaction temperature from ethylene to olefin having 3 or more carbon atoms (described later) can be controlled within a preferable range without reheating by a thermal cracking gas or a heater, or without intermediate heating within a catalytic-reaction unit. This is because the conversion reaction is an exothermic reaction. Therefore, if the temperature of the fraction to be supplied to the reaction is set to fall within the range, an appropriate temperature can be maintained owing to the heat of the conversion reaction without heating. From the similar point of view, the cooling temperature is preferably 300 to 550° C., further preferably 300 to 500° C., and particularly preferably 300 to 450° C.

The cooler 2 is connected to the catalytic-reaction unit 3 by way of a pipe 13. The catalytic-reaction unit 3 is filled with a catalyst containing a medium pore diameter zeolite (hereinafter, simply referred to as "zeolite-containing catalyst"). The ethane-cracked gas cooled in the cooler 2 is supplied by way of the pipe 13 to the catalytic-reaction unit 3 and allowed to be in contact with the zeolite-containing catalyst in the catalytic-reaction unit 3. In this manner, ethylene contained in the ethane-cracked gas is converted into olefin having 3 or more carbon atoms to obtain a catalytic cracking gas containing the olefin (catalytic conversion step). More specifically, the ethane-cracked gas is cooled by the cooler 2 and discharged from the cooler 2 as a cold fraction. Substantially, the whole amount of cold fraction is supplied as it is to the catalytic-reaction unit 3 without applying a purification treatment thereto and subjected to a catalytic conversion reaction. Note that the case where the cold fraction is partly liquefied, as long as the whole amount of cold fraction is supplied to the catalytic conversion reaction, the case is included in this embodiment. Even if the liquefied fraction is supplied to the catalytic-reaction unit 3, substantially no problem is posed.

At this time, the aforementioned acetylene compounds and diene compounds contained in the ethane-cracked gas are also supplied to the catalytic-reaction unit 3. These compounds are highly polymerizable substances and generate coke on a zeolite-containing catalyst to block its active points, causing deterioration of the catalyst. In view of stabilizing the catalytic conversion reaction of ethylene by preventing deterioration of the catalyst due to coking, it has been considered that the amounts of acetylene compounds and diene compounds are preferably minimized to a limit by applying a treatment such as separation by distillation and partial hydrogenation prior the reaction. Therefore, in conventional procedures for olefin having 3 or more carbon atoms, ethylene is purified to remove acetylene compounds, etc. before the catalytic conversion reaction of ethylene is performed. However, when such a treatment is industrially performed, the number of steps inevitably increases. In this respect, it has to say that this process is extremely unfavorable. Then, the present inventors conducted various studies. As a result, they found that ethane-cracked gas can be introduced to the catalytic-reaction unit 3 as it is by simply cooling it without need to be purified. Generally, it is a common sense in performing a multiple-step chemical reaction that a product obtained in a reaction step is purified and then subjected to the next reaction step. In addition, it is also a common sense that a substance that may inhibit a reaction is removed from the reaction system. In view of these, it can be said that a process of subjecting a cold fraction containing ethylene to a catalytic conversion reaction without purifying it, is revolutionary.

Note that the conversion reaction from ethylene to olefin having 3 or more carbon atoms is an exothermic reaction; meaning that as the conversion amount of ethylene increases, calorific value increases. Therefore, to strictly control the conversion reaction temperature, a means for effectively removing the heat of the conversion reaction must be provided. Hence, the catalytic-reaction unit 3 must have performance to deal with these problems.

The type of catalytic-reaction unit 3 is not particularly limited, any type of reactor such as a fixed bed reactor, a fluidized bed reactor and a moving bed reactor may be used.

When the catalytic-reaction unit 3 is a fixed bed reactor, in order to prevent from the aforementioned coking of a catalyst, it is preferred to use a swing type catalytic-reaction unit in which a process of catalytic conversion reaction and a process of catalyst regeneration (describe later) can be switched to each other. Furthermore, in order to remove heat of the conversion reaction, a multi-tubular catalytic-reaction unit is preferred. As coking of a catalyst proceeds, the gas composition at the output of the catalytic-reaction unit 3 varies. Then, to maintain the composition within a constant range, with the passage of time, the temperature of the ethane-cracked gas at the inlet of the catalytic-reaction unit 3 is raised or the intermediate heating temperature the catalytic-reaction unit 3 may be raised. In short, the temperature within the reactor may be raised by external application of heat. As a method of raising the temperature of ethane-cracked gas at the inlet of the catalytic-reaction unit 3, mention may be made of a method of raising the cooling temperature of the cooler 2 and a method of reheating the ethane-cracked gas by a preheater provided upstream the catalytic-reaction unit 3 as described above.

In the case where the catalytic-reaction unit 3 is a fluidized bed reactor, a fluid bed catalytic-reaction unit, a riser catalytic-reaction unit and a spouted bed catalytic-reaction unit are preferably used. More preferably, to efficiency regenerate a catalyst, a fluidized bed reactor equipped with a catalyst regeneration unit, that is, a catalyst-circulating reactor, is used. The catalyst-circulating reactor has a pipe connecting a fluidized bed reactor and a catalyst regeneration unit such that a catalyst can be circulated between them. In the fluidized bed reactor, the catalytic conversion reaction of ethylene using a zeolite-containing catalyst proceeds. A part of the zeolite-containing catalyst subjected to the catalytic conversion reaction is removed continuously or intermittently from the fluidized bed reactor and supplied through the pipe to the catalyst regeneration unit. In the catalyst regeneration unit, at least a part of the carbonaceous compound (coke) adhered to the zeolite-containing catalyst is burned in accordance with the catalyst regeneration method (described later). By virtue of removing coke adhered to the catalyst by burning, the catalytic performance of the catalyst is recovered. Thereafter, the zeolite-containing catalyst is supplied again to the fluidized bed reactor by way of a pipe. In removing reaction-heat generated by the catalytic conversion reaction, a heat removal unit such as a cooling coil is preferably used.

The regeneration method for the catalyst is as follows. When a zeolite-containing catalyst is used for a reaction for a long time, a carbonaceous compound is generated on the catalyst and thus the activity of the catalyst decreases in some cases. When the fixed bed reactor is used, coke accumulated on the zeolite-containing catalyst is burned by supplying an oxygen-containing gas while temporarily terminating the supply of the raw material (ethane-cracked gas) to the reactor to thereby regenerate the zeolite-containing catalyst. Furthermore, when a moving bed reactor and a fluidized bed reactor are used, the zeolite-containing catalyst can be regenerated by removing a part of the zeolite-containing catalyst continuously or intermittently from the reactor and burning it by use of an oxygen-containing gas to burn the coke adhered thereto. The zeolite-containing catalyst regenerated can be returned to the reactor. The catalyst having coke adhered thereto is brought into contact with the air or a gas mixture consisting of the air and an inert gas at high temperature, preferably at 400 to 700° C. to burn the coke. In this way, the catalyst is regenerated.

The zeolite of the zeolite-containing catalyst to be filled in the catalytic-reaction unit 3 is a so-called "medium pore diameter zeolite" having pores of 5 to 6.5 angstroms in diameter. The term "medium pore diameter zeolite" used herein refers to zeolite whose pore sizes are between those of small-pore zeolite represented by Type A zeolite and those of largepore zeolite represented by Mordenite, Type X and Type Y zeolite and which has a so-called oxygen 10-membered ring in its crystalline structure.

The silica/alumina ratio (molar ratio, the same shall apply hereinafter) of zeolite is preferably 20 or more in view of the stableness as a catalyst. The upper limit of the silica/alumina ratio is not particularly limited; however, in view of catalyst activity, generally, the silica/alumina ratio is more preferably within the range of 20 to 1000, and further preferably within the range of 20 to 500, and particularly preferably within the range of 20 to 300. The silica/alumina ratio of zeolite can be obtained in accordance with a known method, for example, by completely dissolving zeolite in an aqueous alkaline solution and analyzing the resultant solution by plasma emission spectroscopic analysis.

Zeolite is not particularly limited as long as it is within the range of the "medium pore diameter zeolite". Examples of the medium pore diameter zeolite include ZSM-5 and so-called pentasil type zeolite, which has an analogous structure as ZSM-5, may be mentioned. More specifically, examples of the medium pore diameter zeolite include ZSM-5, ZSM-8, ZSM-11, ZSM-12, ZSM-18, ZSM-23, ZSM-35 and ZSM-39. Preferable examples of the medium pore diameter zeolite are represented as MFI structures according to the IUPAC nomenclature for zeolite flameworks, and ZSM-5 is particular preferable.

As the medium pore diameter zeolite, use may be made of a metallo aluminosilicate in which the aluminum (Al) atoms constituting a zeolite skeleton are partly substituted with an element such as gallium (Ga), iron (Fe), boron (B) and chromium (Cr) and a metallosilicate in which whole aluminium atoms constituting a zeolite skeleton are substituted with the aforementioned element. The "silica/alumina ratio" of the metallo aluminosilicate or the metallosilicate is computationally obtained by converting the amount of aluminum atoms substituted with the above element in terms of the mol number of $Al_2O_3$ (alumina).

The method for molding a zeolite-containing catalyst is not particularly limited and a general method may be used. More specifically, a method of spray-drying, a method of compression molding and a method of extrusion molding a precursor of a catalyst may be mentioned. In the method for molding a zeolite-containing catalyst, a binder and a diluent (matrix) for molding can be used. The binder and diluent for molding are not particularly limited; however, porous flame-resistant inorganic oxides such as alumina, silica, silica/alumina, zirconia, titania, diatomaceous earth and clay can be used singly or as a mixture. As these binders and/or diluents for molding, commercially available ones may be used or may be synthesized by conventional methods. The mass ratio between the medium pore diameter zeolite and the binder and diluent for molding, i.e., (medium pore diameter zeolite)/(binder and diluent for molding) preferably is within the range of 10/90 to 90/10, and more preferably is within the range of 20/80 to 80/20.

When a zeolite-containing catalyst is molded by spray-drying, at least one type of water soluble compound selected from the group consisting of nitrate, acetate and carbonate may be added to slurry containing a medium pore diameter zeolite before subjecting to spray drying, for improving the shape and mechanical strength. As a preferable water soluble compound, an ammonium salt that is highly water soluble and can be decomposed and removed from the catalyst by baking may be mentioned.

In order to suppress degradation and improve selectivity, a heat treatment may be applied to a zeolite-containing catalyst. Preferably, heat treatment may be applied in the presence of steam, prior to being contact with a cold fraction, i.e., ethane-cracked gas. The temperature of the heat treatment is preferably 500° C. or more, and more preferably 500 to 900° C., regardless of the presence or absence of steam. When steam is present, the heat treatment is preferably performed at a partial pressure of the steam of 0.01 atm or more.

As one of the indexes indicating the initial activities of a zeolite-containing catalyst in the catalytic conversion reaction of ethylene, the acid amount (hereinafter referred to as "TPD acid amount") obtained from desorption at high temperature in ammonia temperature programmed desorption (TPD) spectrum may be used. When a zeolite-containing catalyst has a TPD acid amount exceeding 0, a conversion reaction proceeds. TPD acid amount is preferably not less than 20 μmol/g-zeolite, more preferably 20 to 500 μmol/g-zeolite, and particularly preferably 20 to 300 μmol/g-zeolite. The upper limit of the TPD acid amount is set in view of olefin yield.

The TPD acid amount is measured by the following method. First, a catalyst sample is placed in a measurement cell of an apparatus for measuring a temperature programmed desorption spectrum. The atmosphere of the measurement cell is substituted with helium gas and the temperature is maintained at 100° C. Then, the pressure of the measurement cell is once reduced, and thereafter, increased to 100 Torr as an inner pressure of the measurement cell by supplying ammonia gas. This state is maintained for 30 minutes to allow the catalyst to adsorb ammonia. The inner pressure of the measurement cell is reduced again to remove ammonia not adhered to the catalyst and returned to the ambient atmosphere by supplying helium. Thereafter, the measurement cell is connected to a quadrupole type mass spectrometer, and the inner pressure of the cell is set at 200 Torr. While the temperature of the cell is increased at a rate of 8.33° C./minute up to 600° C., ammonia dissociated from the catalyst is detected to obtain the temperature programmed desorption spectrum. During the desorption, the inner pressure of the cell is controlled so as to maintain about 200 Torr.

The resultant temperature programmed desorption spectrum is divided in accordance with the waveform separation based on the Gaussian distribution. Based on the sum of areas of waveforms (peak) having a peak top at a desorption temperature of 240° C. or more, the desorption amount of ammonia is obtained. The desorption amount of ammonia is divided by the mass of zeolite contained in the catalyst to obtain a TPD acid amount (unit: μmol/g-zeolite). Note that "240° C." is an index for determining a peak top position but does not means that only an area of a waveform portion of 240° C. or more is obtained. As long as a waveform has a peak top at 240° C. or more, the total area of the waveform including the area of less than 240° C. is obtained and used as the "area of the waveform". In the case where there are a plurality of waveforms having a peak top at 240° C. or more, the sum of the areas of individual waveforms is used.

The zeolite-containing catalyst may contain at least one type of metal element selected from the group consisting of metal elements belonging to the Group IB metal of the periodic table (hereinafter simply referred to as "the Group IB metal"). The phrase "containing a metal element" used herein means that a medium pore diameter zeolite in the zeolite-containing catalyst contains the metal element in the state of a cation corresponding to the metal element or that the metal element is carried by the zeolite-containing catalyst in the state of a metal or an oxide. Furthermore, "the periodic table" in the specification refers to the periodic table described in CRC Handbook of Chemistry and Physics, 75th edition, written by David R. Lide et al., published by CRC Press Inc. (1994-1995), page 1-15.

As described above, as one of the preferable embodiments, the zeolite-containing catalyst contains at least one type of metal element selected from the group consisting of the Group IB metal elements, more specifically, copper, silver and gold. As the Group IB metal, preferably copper and silver may be mentioned, and further preferably, silver is mentioned.

As a method for adding at least one type of metal element selected from the group consisting of the Group IB metal elements to the zeolite-containing catalyst, a method for adding a Group IB metal element to a medium pore diameter zeolite may be mentioned. More specifically, mention may be made of a method in which a medium pore diameter zeolite or a zeolite-containing catalyst containing no Group IB metal is subjected to an ion-exchange treatment. The ion exchange treatment may be performed in accordance with either a liquid phase method or a solid phase method. In the solid-phase ion exchange method, a medium pore diameter zeolite or zeolite-containing catalyst (containing no Group IB metal) is impregnated with a solution containing a Group IB metal. In preparing the solution containing a Group IB metal, a salt of a Group IB metal, for example, silver nitrate, silver acetate, silver sulfate, copper chloride, copper sulfate, copper nitrate and gold chloride can be used. Of these, silver nitrate and copper nitrate are preferably used and silver nitrate is more preferably used. The content of the Group IB metal in the medium pore diameter zeolite is preferably 0.1 to 10% by mass, and more preferably 0.2 to 5% by mass based on the total amount of medium pore diameter zeolite. The content of the Group IB metal can be obtained by X-ray fluorometry, etc.

At least a part of the ion exchange sites of the medium pore diameter zeolite contained in the zeolite-containing catalyst is preferably exchanged with a Group IB metal cation and/or proton. Furthermore, the ion exchange sites except the sites exchanged with the Group IB metal cation and/or proton may be exchanged with an alkali metal cation, alkali earth metal cation and other metal cations.

In the catalytic-reaction unit 3, when the cold fraction of the ethane-cracked gas is brought into contact with the zeolite-containing catalyst, ethylene contained in the ethane-cracked gas is converted into olefin having 3 or more carbon atoms by the catalytic conversion reaction. The catalytic conversion reaction is preferably performed in the conditions (shown below) where raw material, i.e., ethylene, contained in the ethane-cracked gas, is converted with high selectivity into olefin having 3 or more carbon atoms and paraffin present in the ethane-cracked gas does not substantially react.

To be more specifically, the reaction temperature is preferably 400 to 650° C., and more preferably 450 to 600° C. The partial pressure of the ethane-cracked gas is desirably low, generally 0.01 to 1 MPa, and more preferably 0.05 to 0.5 MPa. The weight hourly space velocity (WHSV) of the ethane-cracked gas relative to the mass of the zeolite-containing catalyst is within the range of 0.1 to 50 $hr^{-1}$, and preferably 0.2 to 20 $hr^{-1}$.

When the catalytic conversion reaction is performed in the conditions where paraffin does not substantially react, the conversion reaction of ethylene in the ethane-cracked gas is selectively accelerated whereas the conversion reaction of paraffin is suppressed. As a result, by-production of methane, ethane, propane and butane due to the conversion reaction of paraffin is suppressed. As a result, separation and purification of olefin having 3 or more carbon atoms from the reaction mixture can be easily made.

The catalytic conversion reaction of olefin having 2 or more carbon atoms having ethylene as a main component contained in the ethane-cracked gas to produce olefin having 3 or more carbon atoms is an equilibrium reaction. Because of the equilibrium reaction, a maximum yield of olefin having 3 or more carbon atoms can be obtained in the vicinity of an ethylene (main component) conversion rate of 60 to 70% by mass. Therefore, to efficiently obtain olefin having 3 or more carbon atoms, the ethylene conversion rate preferably is within the range of 45 to 85% by mass, and more preferably within the range of 50 to 80% by mass. The ethylene conversion rate herein is calculated in accordance with the following computation expression (2).

Ethylene conversion rate=((ethylene concentration of ethane-cracked gas to be supplied to catalytic-reaction unit 3)−(ethylene concentration of catalytic cracking gas discharged from catalytic-reaction unit 3))/(ethylene concentration of ethane-cracked gas to be supplied to catalytic-reaction unit 3)×100       (2)

The catalytic-reaction unit 3 is connected to the separator 4 by way of a pipe 14. The catalytic cracking gas containing olefin having 3 or more carbon atoms obtained in the catalytic-reaction unit 3 is supplied to the separator 4 by way of the pipe 14 and separated into individual fractions in the separator 4 (separation step). In the separation step, individual fractions are separated by various methods such as fractionation and extraction or in combination of them. The separator 4 is not particularly limited as long as it is suitable for these methods. For example, a distillation tower such as a tray tower and a filled tower may be used. After the catalytic cracking gas is separated, ethylene is recovered through a pipe 15 (and a lighter fraction than ethylene, if present), propylene by way of a pipe 16, a C4 fraction including butene by way of a pipe 17, and a gasoline fraction including aromatic hydrocarbons by way of a pipe 18. The "gasoline fraction" used herein refers to a fraction having a boiling point within the range of 30 to 220° C.

From the propylene recovered by way of the pipe 16, acrylonitrile and polypropylene can be produced by the method described in Japanese Patent No. 3214984, etc.

Figure 2:
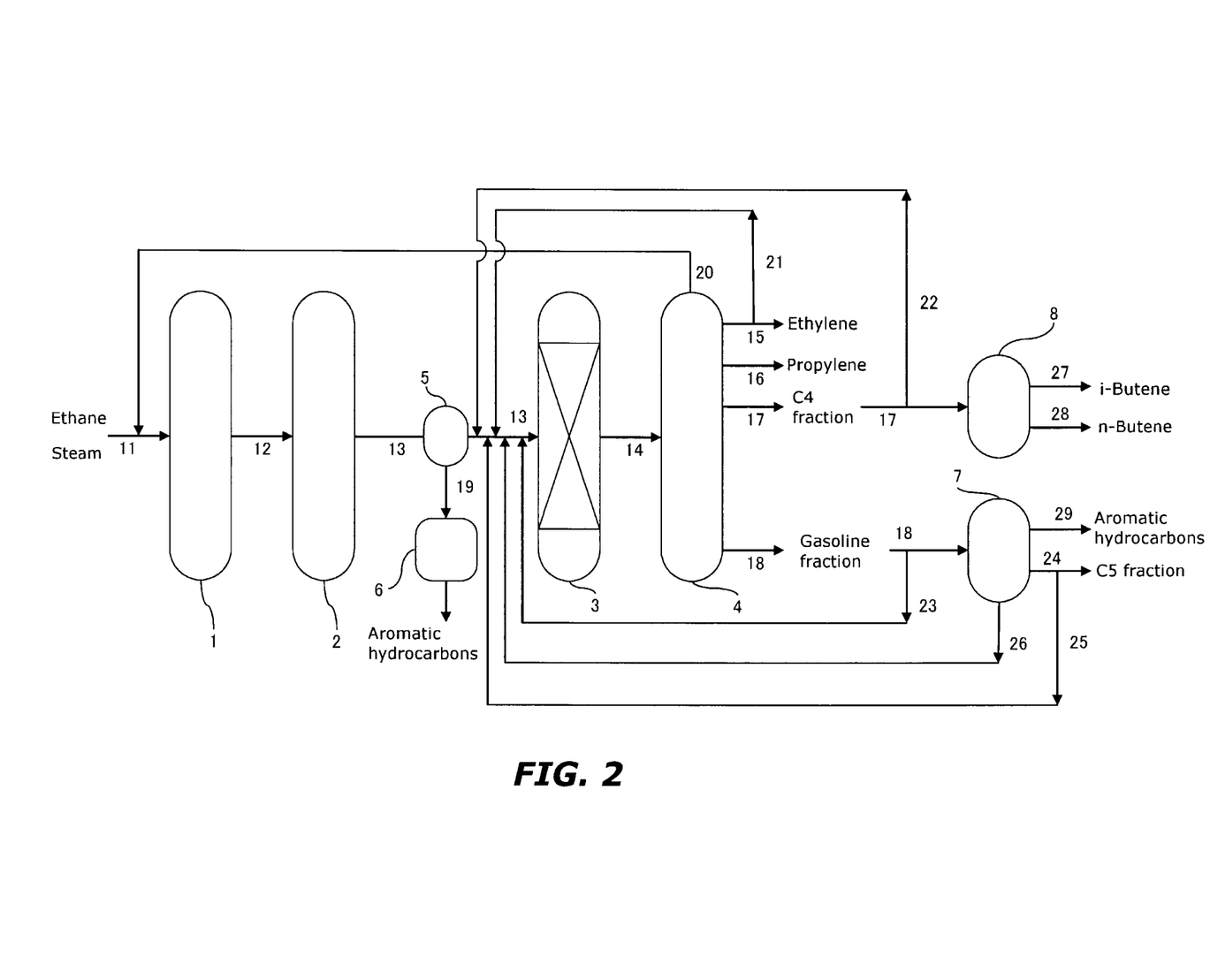
FIG. 2 is a schematic view showing an apparatus for use in a process for producing olefin according to another embodiment of the invention.

FIG. 2 is a schematic view showing an apparatus that can be used in another method for producing olefin according to the embodiment of the invention. The apparatus for manufacturing olefin shown in FIG. 2 is the same as that shown in FIG. 1 except that the following units (1), (2) and (3) are provided:

(1) a gas/liquid separator 5 connected between the cooler 2 and the catalytic-reaction unit 3 and having further a heavy-fraction recovery tank 6 connected thereto;

(2) a separator 8 for separating the C4 fraction discharged from the separator 4 into i-butene and n-butene, and a separator 7 for separating the gasoline fraction into aromatic hydrocarbons and a C5 fraction; and (3) pipes for supplying individual fractions separated in separators 4 and 7 to the thermal cracking reactor 1 or the catalytic-reaction unit 3.

In the following, only the differences from the apparatus for producing olefin shown in FIG. 1 and the process of producing olefin relevant to the apparatus will be discussed.

In the gas/liquid separator 5, the cold fraction obtained by cooling the ethane-cracked gas in the cooler 2 is separated into a heavy fraction (liquid-state), which is a condensate contained therein, and a lighter fraction, i.e., a cold gas (gas/liquid separation step). The gas/liquid separator 5 is not particularly limited as long as it can separate a gas from a liquid. For example, a flush drum or a cyclone type gas/liquid separator may be used. The liquid-state heavy fraction separated by the gas/liquid separator 5 is withdrawn and transferred through a pipe 19 to the heavy fraction recovery tank 6. On the other hand, the non-liquefied gas component, i.e., cold gas, is sent to the catalytic-reaction unit 3 by way of the pipe 13. In this case, the liquid-state heavy fraction does not flow in the catalytic-reaction unit 3, the total amount of cold fraction is not supplied to the catalytic-reaction unit 3. In this aspect, this process differs from the process for producing olefin using the production apparatus shown in FIG. 1. However, as to the cold gas that is not liquefied, since substantially the total amount of the cold gas is subjected as it is without purified to the catalytic conversion reaction, a gas purification step is not provided. In this aspect, this process is common to the production process by the apparatus shown in FIG. 1.

The components contained in the liquid-state heavy fraction and the cold gas vary depending upon the temperature and pressure of the cooler 2. For example, the liquid-state heavy fraction mainly contains a fraction having a boiling point, which is not less than the boiling points of aromatic hydrocarbons, and water; whereas the cold gas mainly contains ethylene and ethane.

To remove a part of the cold fraction as a liquid-state heavy fraction, it is necessary to set the temperature of the cooling step to be low to some extent. As a result, the temperature of the cold gas discharged from the gas/liquid separator 5 may be lower than a suitable temperature of the gas to be supplied to the later-step reaction. In this case, the gas must be reheated before it is supplied to the catalytic-reaction unit 3. This case may be unfavorable from a thermal point of view. However, removal of the heavy fraction exerts an effect of suppressing deterioration of zeolite-containing catalyst filled in the catalytic-reaction unit 3, caused by coking. In this respect, removal of the liquid-state heavy fraction may be preferable.

A part of water contained in the ethane-cracked gas can be removed by condensation depending upon the cooling temperature of the ethane-cracked gas in the cooler 2. Also in this case, it is sometimes necessary to reheat the cold gas similarly to the above case; however, it is preferred to remove the liquid-state heavy fraction since an effect of suppressing permanent (dealuminization) degradation of the zeolite-containing catalyst can be produced.

It is also possible to further extract aromatic hydrocarbons from the heavy fraction withdrawn and transferred to the heavy fraction recovery tank 6 by way of the pipe 19. From the aromatic hydrocarbons recovered herein, similarly to the aromatic hydrocarbons described later, which is recovered from a gasoline fraction by way of a pipe 29, benzene can be produced in a high concentration by a dealkylation reaction and toluene can be produced in a high concentration by a disproportionation.

In this embodiment, in order to increase the yield of each product per unit of ethane serving as a raw material, various fractions are recycled and reused as the raw materials. For example, at least a part of the unreacted ethylene recovered from the separator 4 by way of the pipe 15 is recycled by way of a pipe 21, merged with the cold fraction or the cold gas in the pipe 13 and thereafter supplied to the catalytic-reaction unit 3. In the example shown in FIG. 2, the gas/liquid separator 5 is provided in the middle of the pipe 13, the ethylene for recycle use may be merged with the cold fraction or the cold gas upstream or downstream of the gas/liquid separator 5; however, the downstream is preferred.

At least a part of the ethane fractionated in the separator 4 is recycled by way of the pipe 20, merged with the ethane (not recycle use) in the pipe 11 and thereafter supplied to the thermal cracking reactor 1. Alternatively, in the case where ethane is fractionated into a fraction having 2 or less carbon atoms (hereinafter referred to as the "C2–fraction") and a fraction having 3 or more carbon atoms (hereinafter referred to as the "C3+fraction"), in the separator 4, and thereafter, only ethylene is extracted and recovered from the C2-fraction, the remaining fraction is recycled as an ethane-containing gas through the pipe 21. However, in this case, it is preferred that the fraction to be recycled is limited, thereby avoiding accumulation of methane, which serves as an inert component in the following contact step.

The C4 fraction recovered from the separator 4 by way of the pipe 17 is partly recycled by way of the pipe 22, merged with the cold fraction or the cold gas in the pipe 13, and then supplied to the catalytic-reaction unit 3. When the gas/liquid separator 5 is provided in the middle of the pipe 13, the position at which the C4 fraction for recycle use is merged with the cold fraction or the cold gas is not limited to the upstream or downstream of the gas/liquid separator 5, however, the downstream of the gas/liquid separator 5 is preferred. Furthermore, the end of the pipe 22 at the downstream side is connected to the position in the middle of the pipe 21 at which the ethylene for recycle use is merged with the C4 fraction and then this may be merged (not shown) with the cold fraction or the cold gas.

Furthermore, a part of the gasoline fraction recovered from the separator 4 by way of the pipe 18 may be recycled by way of a pipe 23 and merged with the cold fraction or the cold gas in the pipe 13 and thereafter supplied to the catalytic-reaction unit 3. In this case, the gas/liquid separator 5 is provided in the middle of the pipe 13, the gasoline fraction for recycle use may be merged with the cold gas downstream the gas/liquid separator 5 or merged with the cold fraction upstream thereof (not shown).

The gasoline fraction recovered by way of the pipe 18 is supplied to the separator 7 to separate a C5 fraction from other components and thereafter a part of the C5 fraction recovered by way of a pipe 24 is recycled by way of a pipe 25. In this case, the separator 7 is not particularly limited as long as it can separate the C5 fraction from other components. For example, a distillation tower or a gas/liquid separator may be employed. The C5 fraction for recycle use is merged with the cold fraction or the cold gas in the pipe 13. When the gas/liquid separator 5 is provided in the middle of the pipe 13, the C5 fraction for recycle use is preferably merged with the cold gas downstream of the gas/liquid separator 5. Needless to say, the C5 fraction for recycle use may be merged with the cold fraction upstream the gas/liquid separator 5 (not shown).

A gasoline fraction is supplied to the separator 7 and aromatic hydrocarbons are extracted and solely discharged by way of a pipe 29. A part of the remaining fraction (raffinate) may be recycled by way of the pipe 26 in place of the C5 fraction for recycle use. In this case, the separator 7 is not particularly limited as long as the unit can extract aromatic hydrocarbons from the gasoline fraction. For example, a distillation tower may be used. In this case, the gas/liquid separator 5 is provided in the middle of the pipe 13. Therefore, the raffinate for recycle use may be merged with the cold gas downstream of the gas/liquid separator 5 or may be merged with the cold fraction upstream thereof (not shown).

It is desirable that the temperature of the aforementioned fractions such as ethylene, a C4 fraction and a gasoline fraction to be recycled to the catalytic-reaction unit 3 is appropriately controlled by previously heating them up to the temperature of the cold gas passed through the cooler 2 or by increasing the cooling temperature of the cooler 2. In addition, after the cold gas and the fractions for recycle use are merged, the merged flow may be reheated by a heater (not shown) and supplied to the catalytic-reaction unit 3.

The whole C4 fraction to be recovered by way of the pipe 17, or the part of the C4 fraction except the part to be recycled to the catalytic-reaction unit 3 by way of the pipe 22 is separated by the separator 8. I-butene can be recovered by way of the pipe 27 and n-butene can be recovered by way of the pipe 28. The separator 8 is not particularly limited as long as it can separate i-butene and n-butene. For example, a distillation tower such as a tray tower and a filled tower may be mentioned.

From the i-butene recovered, methyl methacrylate can be produced by the process described in Japanese Patent No. 4076227, etc. Furthermore, from the n-butene, butanol may be produced by the process described in Japanese Patent No. 2005-225781, etc., and methyl ethyl ketone may be produced. Also, butadiene can be produced by the process described in Japanese Patent Publication No. 3-2126, etc.

EXAMPLES

Figure 3:
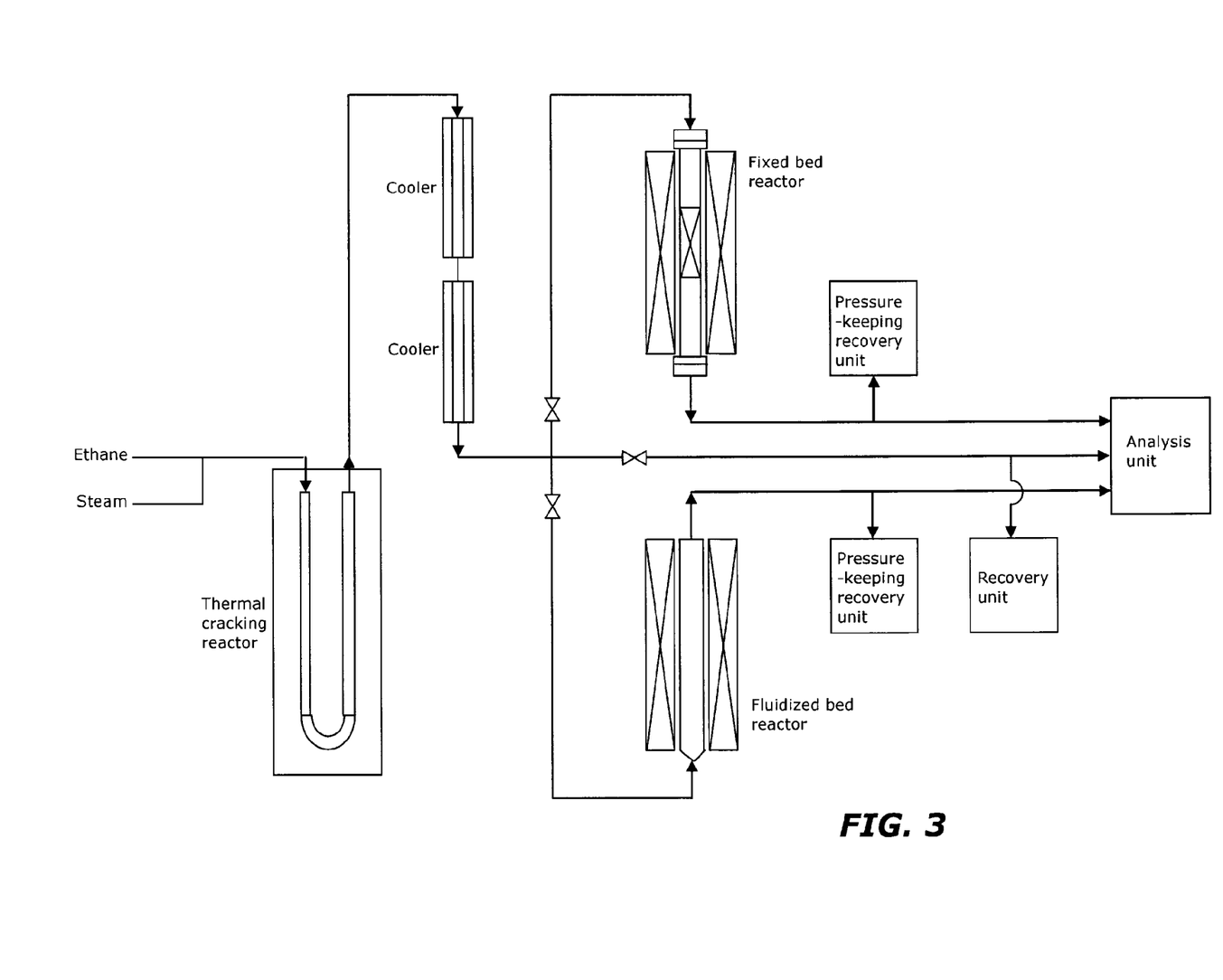
FIG. 3 is a schematic view showing the apparatus for producing olefin used in an example of the present invention.

The present invention will be more specifically described by way of Examples; however, the present invention is not limited only to these Examples. FIG. 3 is a schematic view showing the apparatus for producing olefin (thermal cracking-catalytic conversion reaction apparatus) used in the following Examples. Note that "pressure-keeping recovery unit" and "recovery unit" shown in FIG. 3 are equipped with a separator (not shown). Pipes are provided such that individual components separated by the separator can be recycled to the thermal cracking reactor, cooler, a fixed bed reactor and a fluidized bed reactor.

The measurement methods carried out in Examples are as follows.
(1) Measurement of Silica/Alumina Ratio of Zeolite Zeolite (0.2 g) was added to a 5N aqueous NaOH solution (50 g). This was transferred to a micro cylinder made of stainless steel and equipped with an inner tube made of Teflon (registered trade mark) and the micro cylinder was closed airtight. The micro cylinder was held in an oil bath for 15 to 70 hours to completely dissolve zeolite. The resultant zeolite solution was diluted with ion-exchanged water and the concentrations of silicon and aluminium in the diluted solution were measured by a plasma emission spectrophotometer (ICP apparatus). Based on the results, the silica/alumina ratio of zeolite was calculated.

The ICP apparatus and the measurement conditions are as follows.
Apparatus: trade name "JOBIN YVON (JY138 ULTRACE)" manufactured by Rigaku Denki,
Measurement conditions:
Silicon measurement wavelength: 251.60 nm
Aluminium measurement wavelength: 396.152 nm
Plasma power: 1.0 kw
Nebulizer gas: 0.28 L/minute
Sheath gas: 0.3 to 0.8 L/minute
Coolant gas: 13 L/minute
(2) Measurement of TPD Acid Amount Using a full-automatic temperature programmed desorption spectrum apparatus "TPD-1-ATw" (trade name) manufactured by BEL Japan Inc., the TPD acid amount of catalyst was measured by the following method in accordance with the manual attached thereto.

First, a catalyst sample (100 mg) was filled in a dedicated glass cell. At this time, when the catalyst sample was a molded product, it was pulverized and filled. Subsequently, while helium was supplied as a carrier gas to the cell at a rate of 50 cc/minute, a heat treatment was applied as a pretreatment for 1 hour by raising the temperature of the sample to 500° C., and then the temperature was set at 100° C. After the temperature was stabilized at 100° C., the pressure within the cell was reduced to 0.01 Torr. Subsequently, ammonia gas was supplied into the cell and the pressure was adjusted to 100 Torr. The measurement cell was allowed to stand in this state for 30 minutes to allow the catalyst to adsorb ammonia. The pressure of the cell was reduced again to remove ammonia that does not adhered to the catalyst. Subsequently, helium serving as a carrier gas was supplied to the measurement cell and the pressure of the cell was returned to the atmospheric pressure. Thereafter, the pressure of the cell was controlled such that the pressure within the cell can be maintained at 200 Torr. While the temperature was increased at a rate of 8.33° C./minute to 600° C., ammonia dissociated from the catalyst was measured by a quadrupole type mass spectrometer (manufactured by Anelva) connected to the cell to obtain a temperature programmed desorption spectrum.

The obtained temperature programmed desorption spectrum was separated by using waveform analysis software "Wave Analysis" (trade name) manufactured by BEL Japan Inc. in accordance with the waveform separation based on the Gaussian distribution.

As a result of the waveform separation analysis, an ammonia dissociation amount was obtained from the sum of areas of waveforms having a peak top at a dissociation temperature of 240° C. or more and based on the calibration curve obtained separately and converted in terms of zeolite by mass (unit: μmol/g-zeolite).
(3) Composition Analysis of Product The ethane-cracked gas (cold fraction) supplied from the outlet of the cooler or the catalytic cracking gas supplied from the outlet of the fixed bed reactor or the fluidized bed reactor is directly introduced to gas chromatography (detector: TCD, FID) provided in the "analysis unit" shown in FIG. 3 to analyze the composition. Note that the gas chromatographic analysis was performed in the following conditions.
(Conditions of Gas Chromatography Analysis)
Apparatus: Trade name "GC-17A" manufactured by Shimadzu Corporation,
Column: Custom capillary column, trade name "SPB-1" (manufactured by SUPELCO USA), inner diameter: 0.25 mm, length: 60 m, film thickness: 3.0 μm,
Sample gas amount: 1 mL (Sampling line was maintained at 200 to 300° C.)
Temperature raising program: maintained at 40° C., for 12 minutes, subsequently, raised at a rate of 5° C./minute to 200° C., and thereafter, maintained at 200/° C. for 22 minutes,
Sprit ratio: 200:1,
Carrier gas (nitrogen) flow rate: 120 mL/minute,
FID detector: Air supply pressure: 50 kPa (about 500 mL/minute), hydrogen supply pressure: 60 kPa (about 50 mL/minute),
Measuring method: The TCD detector and the FID detector were connected in series and hydrocarbon having 1 or 2 carbon atoms in addition to hydrogen atoms was detected by the TCD detector and a hydrocarbon having 3 or more carbon atoms was detected by the FID detector. Ten minutes after initiation of the analysis, output was changed from the TCD detector to the FID detector.

Example 1

H type ZSM-5 zeolite having a silica/alumina ratio of 27 was kneaded with silica sol and subjected to extrusion molding to obtain a columnar catalyst having a diameter of 2 mm and a length of 3 to 5 mm. The content of zeolite in the obtained molded product was 50% by mass. The obtained molded product was dried in the air at 120° C. for 6 hours and thereafter baked in the air at 700° C. for 5 hours. The baked columnar catalyst was stirred in a 1N aqueous nitric acid solution to perform ion exchange, and thereafter washed with water and dried in the air at 120° C. for 5 hours to obtain a zeolite-containing catalyst. TPD acid amount of zeolite-containing catalyst was 222 μmol/g-catalyst. More specifically, the TPD acid amount in terms of zeolite mass was 444 μmol/g-zeolite.

To U-shape tubular thermal cracking reactor having an inner diameter of 9.4 mm and a whole length of 4.0 m, ethane heated to 600° C. was supplied at a rate of 1.21 kg/hour and steam at a rate of 0.47 kg/hour and thermal cracking reaction was performed by setting the outlet temperature of the thermal cracking reactor at 847° C. and outlet pressure at 0.21 MPaG. Subsequently, ethane-cracked gas discharged from the thermal cracking reactor was cooled by a cooler to a temperature of 250° C. to obtain a cold fraction.

Of the obtained cold fraction (water content: 27.7% by mass) a fraction of 32.2 g/hour was reheated to 390° C. by a heater (not shown) and loaded to a stainless steel fixed bed reactor having an inner diameter of 15 mm and filled with the zeolite-containing catalyst (8.0 g). A catalytic conversion reaction was performed at a reaction temperature of 550° C. and a reaction pressure of 0.07 MPaG. The yields of individual components of the ethane-cracked gas and the catalytic cracking gas obtained 4 hours after initiation of the reaction (on a dry basis, the same shall apply hereinafter) are shown in Table 1. Note that, in Examples 1 to 3, yields are represented by percentage by mass, assuming that the ethane to be supplied to the thermal cracking reactor is 100% by mass and the whole amount of cold fraction after the thermal cracking reaction is supplied to the reactor.

Example 2

H type ZSM-5 zeolite having a silica/alumina ratio of 412 was kneaded with silica sol and subjected to extrusion molding. The content of zeolite of the obtained molded product was 50% by mass. The obtained molded product was dried in the air at 120° C. for 6 hours and baked in the air at 700° C. for 5 hours to obtain a columnar catalyst having a diameter of 2 mm and a length of 3 to 5 mm. The columnar catalyst obtained was stirred in a 1N aqueous nitric acid solution to perform ion exchange, and thereafter washed with water and dried in the air, at 120° C. for 5 hours to obtain a zeolite-containing catalyst. The TPD acid amount of zeolite-containing catalyst was 43 μmol/g-catalyst. More specifically, the TPD acid amount in terms of zeolite mass was 86 μmol/g-zeolite.

A thermal cracking reaction was performed in the same manner as in Example 1. Subsequently, the ethane-cracked gas discharged from the thermal cracking reactor was cooled by the cooler up to 397° C. to obtain a cold fraction. Of the obtained cold fraction, a faction of 12.3 g/hour was loaded to a stainless steel fixed bed reactor having an inner diameter of 15 mm and filled with the zeolite-containing catalyst (8.56 g). A catalytic conversion reaction was performed at a reaction temperature of 550° C. and a reaction pressure of 0.14 MPaG. The yields of individual components of the ethane-cracked gas and the catalytic cracking gas obtained 18 hours after initiation of the reaction are shown in Table 2.

Example 3

To 2000 g of silica sol (silica content: 15% by mass manufactured by Nalco Company), 40 g of nitric acid (a reagent containing nitric acid (60% by mass) manufactured by Wako Pure Chemical Industries Ltd.) was added to adjust pH to 1.1. To the mixture, 100 g of ammonium nitrate (special-grade reagent manufactured by Wako Pure Chemical Industries Ltd.) was added, and subsequently, $NH_4$-type ZSM-5 zeolite (300 g) having a silica/alumina ratio of 42 was added to prepare a catalyst raw-material slurry. The obtained catalyst raw-material slurry was stirred at 25° C. for 3 hours and spray-dried by a spray dryer to obtain dry powder. The spray-dry conditions for the catalyst raw-material slurry were: a spray dryer inlet flow temperature: 220° C., outlet flow temperature: 130° C., and spray dry system: rotating disk system. The obtained dry powder was baked in a muffle furnace at 700° C. for 5 hours in the air to obtain powdery catalyst.

The obtained powdery catalyst was ion exchanged in a 1 N diluted aqueous nitric acid solution at 25° C. for 1 hour, and thereafter washed with water and dried in the air at 120° C. for 5 hours to prepare an ion-exchanged catalyst. The ion exchanged catalyst was filled in a stainless steel reactor having an inner diameter of 60 mm φ and treated with steam in the conditions: a temperature of 650° C., 0.1 MPaG, steam flow rate of 12 g/hour and a nitrogen flow rate of 22.4 NL/hour, for 24 hours to obtain a zeolite-containing catalyst. The TPD acid amount of zeolite-containing catalyst thus obtained was 17 μmol/g-catalyst. More specifically, the TPD acid amount in terms of zeolite mass was 34 μmol/g-zeolite.

A thermal cracking reaction was performed in the same manner as in Example 1 except that the outlet temperature of the thermal cracking reactor was set at 855° C. Subsequently, the ethane-cracked gas discharged from the thermal cracking reactor was cooled by the cooler to 415° C. to obtain a cold fraction. Of the cold fraction obtained (water content: 27.6% by mass), a fraction of 221 g/hour was loaded to a stainless steel fluidized bed reactor having an inner diameter of 52.7 mm and filled with the zeolite-containing catalyst (212 g). A catalytic conversion reaction was performed at a reaction temperature of 550° C. and a reaction pressure of 0.14 MPaG. At intervals of 1 hour after initiation of the reaction, the zeolite-containing catalyst (9.0 g) was taken out from the reactor and baked in a muffle furnace at 580° C. for 2 hours in the air. Owing to the baking, a carbonaceous compound adhered to the zeolite-containing catalyst was almost completely (100%) removed. Up to 4 hours after initiation of reaction, a fresh zeolite-containing catalyst (9.0 g) was added to the fluidized bed reactor in place of the zeolite-containing catalyst removed; however, on and after 5 hours, the baked zeolite-containing catalyst (9.0 g) was returned to the fluidized bed reactor.

The yields of individual components of the ethane-cracked gas and the normal-state catalytic cracking gas are shown in Table 3.

Example 4

Catalytic cracking gas was obtained in the same manner as in Example 3 except that the cold fraction (221 g/hour) to be loaded to the fluidized bed reactor was changed to a gas mixture of the cold fraction (193 g/hour) and ethylene 21 (g/hour) and the gas mixture was loaded to the fluidized bed reactor at 373° C. Example 4 corresponds to the case where 70% of unreacted ethylene remaining in the catalytic cracking gas was recycled.

The yields of individual components of the gas mixture and the normal-state catalytic cracking gas are shown in Table 4.

Example 5

The same procedure as in Example 3 was repeated up to initiation of the catalytic conversion reaction. The obtained catalytic cracking gas was cooled by use of a heat exchanger (not shown) at the outlet of the fluidized bed reactor to 10° C., and thereafter, supplied to a gas/liquid separator (not shown). After water was separated, the catalytic cracking gas was supplied to a distillation tower (not shown) serving as a separator. From the bottom of the tower, a solution mixture of a C4 fraction and a gasoline fraction was withdrawn and 50% of the solution mixture was recycled to the fluidized bed reactor. The catalytic conversion reaction conditions were: the supply amount of stabilized cold fraction to the fluidized bed reactor: 190 g/hour, the supply amount of recycled C4/gasoline fraction to the fluidized bed reactor: 25 g/hour, the gas mixture of these was reheated before supplied to the fluidized bed reactor. The temperature of the gas mixture at the inlet of the fluidized bed reactor was 423° C.

The yields of individual components of the gas mixture and the normal-state catalytic cracking gas are shown in Table 4.

The total yield of C3 to C5 olefins per ethane to be supplied to the thermal cracking reactor is 24.6% by mass in Example 3 (single path), 31.8% by mass in Example 4 (recycle case) and 26.2% by mass Example 5 (recycle case). As a result, it was found that the yield of olefin having 3 or more carbon atoms is increased by recycling.

Example 6

H type ZSM-5 zeolite having a silica/alumina ratio of 280 was kneaded with silica sol and subjected to extrusion molding. The content of zeolite in the obtained molded product was 50% by mass. The molded product obtained was dried in the air at 120° C. for 6 hours and baked in the air at 700° C. for 5 hours to obtain a columnar catalyst having a diameter of 2 mm and a length of 3 to 5 mm. The columnar catalyst obtained was stirred in a 1N aqueous nitric acid solution to perform ion exchange, and thereafter, washed with water and dried in the air at 120° C. for 5 hours to obtain a zeolite-containing catalyst.

A thermal cracking reaction was performed in the same manner as in Example 1 except that the outlet temperature of the thermal cracking reactor was set at 810° C. Subsequently, the ethane-cracked gas discharged from the thermal cracking reactor was cooled by the cooler up to 372° C. to obtain a cold fraction.

Of the obtained cold fraction (water content: 27.7% by mass), a fraction of 46.7 g/hour was loaded to a stainless steel fixed bed reactor having an inner diameter of 27 mm and filled with the zeolite-containing catalyst (30.0 g). A catalytic conversion reaction was initiated at a reaction temperature of 500° C. and a reaction pressure of 0.14 MPaG.

The yields of individual components of the ethane-cracked gas and the catalytic cracking gas obtained after the reaction was continuously performed for 24 hour are shown in Table 5. Note that these yields are represented by percentage by mass assuming that the ethane (excluding ethane recycled) to be supplied to the thermal cracking reactor was 100% by mass and the whole amount of cold fraction after the thermal cracking reaction was supplied to the fixed bed reactor.

The ethane content in the catalyst reaction gas 24 hours after initiation of the reaction was 53.1% by mass on a dry basis. From the catalytic cracking gas containing olefin having 3 or more carbon atoms, ethane was separated, recovered and at least a part of the ethane was recycled to the thermal cracking reactor. In this way, the amount of ethane to be newly supplied to an olefin production apparatus was successfully reduced.

Example 7

The zeolite-containing catalyst prepared in Example 1 was filled in a quart glass reactor having an inner diameter of 20 mmφ and treated with steam in the conditions: a temperature of 650° C., ambient pressure, a steam flow rate of 31.8 g/hour, a nitrogen flow rate of 2.76 NL/hour and an air flow rate of 6.72 NL/hour, for 24 hours to obtain a zeolite-containing catalyst according to Example 7. The TPD acid amount of zeolite-containing catalyst thus obtained was 21 μmol/g-catalyst. More specifically, the TPD acid amount in terms of zeolite mass was 42 μmol/g-zeolite.

The thermal cracking reaction was performed in the same manner as in Example 3. Subsequently, the ethane-cracked gas discharged from the thermal cracking reactor was cooled by the cooler up to 80° C. At this time, a condensate was generated. The condensate (heavy fraction) was separated and collected by a gas/liquid separator (not shown) provided in the middle of the outlet pipe of the cooler. As a result, 15% by mass of heavy fraction of the ethane-cracked gas was recovered.

From the ethane-cracked gas, the heavy fraction was separated. Of the remaining cold gas (water content: 15.6% by mass), the cold gas (12.0 g/hour) was reheated to 389° C. by a heater (not shown) and thereafter, loaded to a stainless steel fixed bed reactor having an inner diameter of 15 mm and filled with the zeolite-containing catalyst (8.56 g). A catalytic conversion reaction was performed at a reaction temperature of 550° C. and a reaction pressure of 0.12 MPaG. The yields of individual components of the cold gas and the catalytic cracking gas obtained 13 hours after initiation of the reaction are shown in Table 6. Note that these yields are represented by percentage by mass assuming that the ethane to be supplied to the thermal cracking reactor was 100% by mass and the whole amount of cold gas was supplied to the fixed bed reactor.

TABLE 1

|  | Ethane-cracked gas | Catalytic cracking gas |
|---|---|---|
| $H_2$ | 4.2 | 4.2 |
| $CH_4$ | 6.6 | 7.3 |
| $C_2H_4$ | 51.2 | 16.7 |
| $C_2H_6$ | 30.1 | 32.3 |
| $C_3H_6$ | 1.7 | 12.2 |
| $C_3H_8$ | 0.2 | 4.4 |
| $C_4H_8$ | 0.2 | 6.1 |
| $C_4H_{10}$ | 0.4 | 3.6 |
| Gasoline fraction | 3.2 | 13.1 |
| $C_5H_{10}$ | 0.2 | 2.6 |
| Aromatic hydrocarbons | 2.4 | 8.4 |
| $CO_x$ | 0.1 | 0.1 |
| Acetylene compounds Diene compounds | 2.1 | 0.0 |

TABLE 2

|  | Ethane-cracked gas | Catalytic cracking gas |
|---|---|---|
| $H_2$ | 4.2 | 4.7 |
| $CH_4$ | 6.6 | 8.6 |
| $C_2H_4$ | 51.2 | 16.2 |
| $C_2H_6$ | 30.1 | 35.0 |
| $C_3H_6$ | 1.7 | 13.7 |
| $C_3H_8$ | 0.2 | 1.7 |
| $C_4H_8$ | 0.2 | 7.2 |
| $C_4H_{10}$ | 0.4 | 1.4 |
| Gasoline fraction | 3.2 | 11.4 |
| $C_5H_{10}$ | 0.2 | 3.2 |
| Aromatic hydrocarbons | 2.4 | 6.5 |
| $CO_x$ | 0.1 | 0.1 |
| Acetylene compounds Diene compounds | 2.1 | 0.0 |

TABLE 3

|  | Ethane-cracked gas | Catalytic cracking gas |
|---|---|---|
| $H_2$ | 4.4 | 4.8 |
| $CH_4$ | 7.9 | 8.3 |
| $C_2H_4$ | 52.5 | 17.9 |
| $C_2H_6$ | 26.1 | 27.7 |
| $C_3H_6$ | 1.7 | 14.1 |
| $C_3H_8$ | 0.2 | 4.1 |
| $C_4H_8$ | 0.2 | 7.5 |
| $C_4H_{10}$ | 0.3 | 3.0 |
| Gasoline fraction | 4.2 | 12.5 |
| $C_5H_{10}$ | 0.2 | 3.0 |
| Aromatic hydrocarbons | 3.0 | 8.2 |
| $CO_x$ | 0.1 | 0.1 |
| Acetylene compounds Diene compounds | 2.4 | 0.0 |

TABLE 4

|  | Example 4 | | Example 5 | |
|---|---|---|---|---|
|  | Gas mixture | Catalytic cracking gas | Gas mixture | Catalytic cracking gas |
| $H_2$ | 3.8 | 4.2 | 3.7 | 4.0 |
| $CH_4$ | 6.9 | 7.3 | 6.7 | 7.0 |
| $C_2H_4$ | 58.6 | 18.4 | 44.3 | 17.9 |
| $C_2H_6$ | 22.7 | 24.5 | 22.0 | 23.5 |
| $C_3H_6$ | 1.5 | 15.8 | 1.5 | 12.7 |
| $C_3H_8$ | 0.2 | 4.6 | 0.2 | 3.7 |
| $C_4H_8$ | 0.2 | 8.5 | 3.6 | 6.8 |
| $C_4H_{10}$ | 0.3 | 3.2 | 2.9 | 5.3 |
| Gasoline fraction | 3.6 | 13.3 | 13.0 | 18.9 |
| $C_5H_{10}$ | 0.2 | 3.4 | 1.9 | 2.7 |
| Aromatic hydrocarbons | 2.6 | 8.4 | 9.7 | 14.4 |
| $CO_x$ | 0.1 | 0.1 | 0.1 | 0.1 |
| Acetylene compounds Diene compounds | 2.1 | 0.0 | 2.0 | 0.0 |

TABLE 5

|  | Ethane-cracked gas | Catalytic cracking gas |
|---|---|---|
| $H_2$ | 3.1 | 3.5 |
| $CH_4$ | 2.6 | 3.4 |
| $C_2H_4$ | 40.5 | 9.5 |
| $C_2H_6$ | 50.3 | 53.1 |
| $C_3H_6$ | 1.0 | 9.8 |
| $C_3H_8$ | 0.1 | 1.6 |
| $C_4H_8$ | 0.2 | 7.0 |
| $C_4H_{10}$ | 0.5 | 2.1 |
| Gasoline fraction | 0.7 | 10.0 |
| $C_5H_{10}$ | 0.2 | 3.4 |
| Aromatic hydrocarbons | 0.5 | 3.5 |
| $CO_x$ | 0.0 | 0.0 |
| Acetylene compounds Diene compounds | 1.0 | 0.0 |

TABLE 6

|  | Cold gas | Catalytic cracking gas |
|---|---|---|
| $H_2$ | 4.4 | 5.0 |
| $CH_4$ | 7.9 | 10.2 |
| $C_2H_4$ | 52.8 | 16.5 |
| $C_2H_6$ | 26.3 | 27.8 |
| $C_3H_6$ | 1.7 | 15.8 |
| $C_3H_8$ | 0.2 | 2.7 |
| $C_4H_8$ | 0.2 | 8.3 |
| $C_4H_{10}$ | 0.3 | 2.3 |
| Gasoline fraction | 3.6 | 11.1 |
| $C_5H_{10}$ | 0.2 | 3.1 |

TABLE 6-continued

|  | Cold gas | Catalytic cracking gas |
|---|---|---|
| Aromatic hydrocarbons | 3.0 | 6.4 |
| $CO_x$ | 0.1 | 0.1 |
| Acetylene compounds Diene compounds | 2.4 | 0.0 |

The present application is based on Japanese Patent Application No. 2008-237886 filed on Sep. 17, 2008 and the content thereof is incorporated by reference herein.

INDUSTRIAL APPLICABILITY

It is possible to produce olefin having 3 or more carbon atoms simply and stably from ethane by the process for producing olefin and the production apparatus of the present invention. Furthermore, the present invention is useful as an industrial production process since variety of raw materials can be used for producing olefin. Since olefin having 3 or more carbon atoms can be produced stably in a simple method from ethane, the present invention is extremely advantageous to put it into industrial use.

EXPLANATIONS OF LETTERS OR NUMERALS

1: THERMAL CRACKING REACTOR
2: COOLER
3: CATALYTIC-REACTION UNIT
4, 7, 8: SEPARATOR
5: GAS/LIQUID SEPARATOR
6: HEAVY-FRACTION RECOVERY TANK
11: PIPE FOR SUPPLYING ETHANE AND STEAM TO THERMAL CRACKING REACTOR
12: PIPE FOR SUPPLYING ETHANE-CRACKED GAS TO COOLER
13: PIPE FOR SUPPLYING COLD FRACTION OR COLD GAS TO CATALYTIC-REACTION UNIT
14: PIPE FOR SUPPLYING CATALYTIC CRACKING GAS TO SEPARATOR
15: PIPE FOR RECOVERING ETHYLENE FROM SEPARATOR
16: PIPE FOR RECOVERING PROPYLENE FROM SEPARATOR
17: PIPE FOR RECOVERING C4 FRACTION FROM SEPARATOR
18: PIPE FOR RECOVERING GASOLINE FRACTION FROM SEPARATOR
19: PIPE FOR RECOVERING HEAVY FRACTION FROM COLD FRACTION
20: PIPE FOR RECYCLING ETHANE
21: PIPE FOR RECYCLING ETHYLENE
22: PIPE FOR RECYCLING C4 FRACTION
23: PIPE FOR RECYCLING GASOLINE FRACTION
24: PIPE FOR RECOVERING C5 FRACTION
25: PIPE FOR RECYCLING C5 FRACTION
26: PIPE FOR RECYCLING RAFFINATE
27: PIPE FOR RECOVERING I-BUTENE
28: PIPE FOR RECOVERING N-BUTENE
29: PIPE FOR RECOVERING AROMATIC HYDROCARBONS

The invention claimed is:
1. A process for producing propylene comprising the steps of:
thermally cracking ethane in the presence of steam to obtain an effluent comprising ethylene;

cooling the effluent comprising ethylene to a temperature of 600° C. or less to obtain a cold fraction;

catalytically cracking the cold fraction in the presence of a catalyst comprising a zeolite to obtain a product gas comprising propylene, wherein an ethylene conversion rate in the catalytic cracking of the cold fraction is within a range of 45% to 85% by mass; and separating and recovering said propylene, wherein [1] the zeolite comprises ZSM-5 zeolite,

[2] silica to alumina ratio of the zeolite is within a range of 20 to 500, and

[3] temperature programmed desorption (TPD) acid amount of the zeolite is within a range of 20 to 500 µmol/g-zeolite.

2. A process for producing propylene comprising the steps of:

thermally cracking ethane in the presence of steam to obtain an effluent comprising ethylene;

cooling the effluent comprising ethylene to a temperature of 600° C. or less to obtain a cold fraction;

separating said cold fraction into a liquid-state heavy fraction and a cold gas fraction; and catalytically cracking the cold gas fraction in the presence of a catalyst comprising a zeolite to obtain a product gas comprising propylene, wherein an ethylene conversion rate in the catalytic cracking of the cold gas fraction is within a range of 45% to 85% by mass, wherein [1] the zeolite comprises ZSM-5 zeolite,

[2] silica to alumina ratio of the zeolite is within a range of 20 to 500, and

[3] temperature programmed desorption (TPD) acid amount of the zeolite is within a range of 20 to 500 µmol/g-zeolite.

3. The process according to claim 2, further comprising the step of separating at least a part of aromatic hydrocarbons from the liquid-state heavy fraction.

4. The process according to claim 1, wherein said step of catalytically cracking the cold fraction is conducted in a fluidized bed reactor, and further comprising:

removing continuously or intermittently a part of coked catalyst from the fluidized bed reactor and passing to a regenerator;

regenerating the coked catalyst with an oxygen-containing gas to produce a regenerated catalyst; and recycling the regenerated catalyst to the fluidized bed reactor.

5. The process according to claim 1, wherein said effluent comprising ethylene is cooled to from 300° C. to 600° C.

6. The process according to claim 1, further comprising the steps of:

separating ethane from said product gas; and recycling at least a part of said ethane to said step of thermally cracking ethane.

7. The process according to claim 1, wherein the product gas comprising propylene is separated to obtain at least one of a C4 fraction or a gasoline fraction.

8. The process according to claim 7, wherein at least a part of unreacted ethylene separated from the product gas is recycled to said step of catalytically cracking the cold fraction.

9. The process according to claim 7, wherein the C4 fraction is separated to obtain i-butene and/or n-butene.

10. The process according to claim 7, wherein the gasoline fraction is separated to obtain at least a part of aromatic hydrocarbons.

11. The process according to claim 2, wherein said catalytically cracking of the cold gas fraction is conducted in a fluidized bed reactor, and further comprising:

removing continuously or intermittently a part of coked catalyst from the fluidized bed reactor and passing to a regenerator;

regenerating the coked catalyst with an oxygen-containing gas to produce a regenerated catalyst; and recycling the regenerated catalyst to the fluidized bed reactor.

12. The process according to claim 2, wherein said effluent comprising ethylene is cooled to from 300° C. to 600° C.

13. The process according to claim 2, further comprising the steps of:

separating ethane from said product gas; and recycling at least a part of said ethane to said step of thermally cracking ethane.

14. The process according to claim 2, wherein the product gas further comprises a C4 fraction or a gasoline fraction.

15. The process according to claim 14, wherein at least a part of unreacted ethylene separated from the product gas is recycled to said step of catalytically cracking the cold gas fraction.

16. The process according to claim 14, wherein the C4 fraction is separated to obtain i-butene and/or n-butene.

17. The process according to claim 14, wherein the gasoline fraction is separated to obtain at least a part of aromatic hydrocarbons.

* * * * *